United States Patent

Lancieri

[11] Patent Number: 5,428,921
[45] Date of Patent: Jul. 4, 1995

[54] CHUM BOBBER FISHING LURE

[76] Inventor: Domenick C. Lancieri, 8505 W. Drew Ct., Homosassa, Fla. 34448

[21] Appl. No.: 264,696

[22] Filed: Jun. 23, 1994

[51] Int. Cl.⁶ .............................................. A01K 97/02
[52] U.S. Cl. .................................................... 43/44.99
[58] Field of Search .................. 43/44.99, 44.87, 44.9, 43/44.91

[56] References Cited

U.S. PATENT DOCUMENTS

| | | | |
|---|---|---|---|
| 2,612,718 | 10/1952 | Steinberg | 43/44.99 |
| 2,758,410 | 8/1956 | Cowsert | 43/44.87 |
| 2,780,021 | 2/1957 | Fagg | 43/44.99 |
| 2,842,890 | 7/1958 | Goroni | 43/44.99 |
| 2,844,907 | 7/1958 | Merton | 43/44.99 |
| 3,780,467 | 12/1973 | Lueck | 43/44.99 |
| 3,974,591 | 8/1976 | Ray | 43/43.14 |
| 4,550,521 | 11/1985 | Hayden | 43/41 |
| 4,961,280 | 10/1990 | Hudson | 43/44.99 |
| 5,107,617 | 4/1992 | Pendieton | 43/44.99 |
| 5,131,183 | 7/1992 | Thayer | 43/44.99 |

Primary Examiner—Kurt Rowan
Attorney, Agent, or Firm—Richard L. Miller

[57] ABSTRACT

A floating fishing lure, for attaching on a fishing line, comprising a hollow sphere having an upper hemisphere and a lower hemisphere, having a cavity therebetween. The lower hemisphere has a line clip for attaching to the fishing line. The lower hemisphere has a fill hole, in communication with the cavity, for filling the cavity with a fish attracting substance. The fill hole is selectively covered with a rubber band cover. The lower hemisphere has at least one vent hole, smaller in size than the fill hole, for slowly releasing the fish attracting substance.

11 Claims, 1 Drawing Sheet

U.S. Patent  July 4, 1995  5,428,921
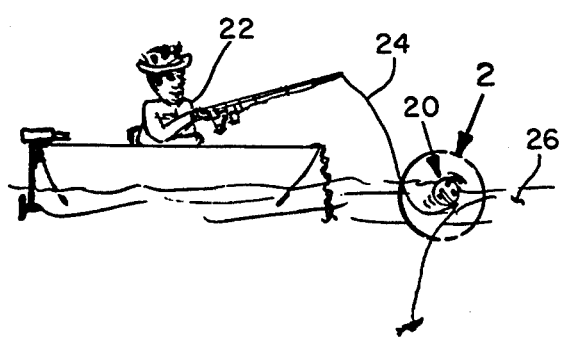
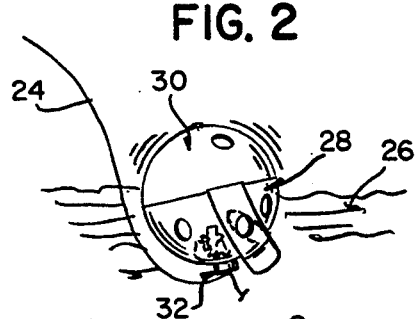
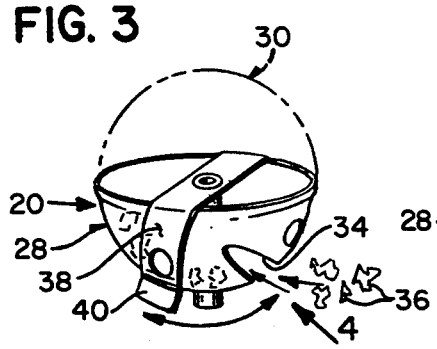
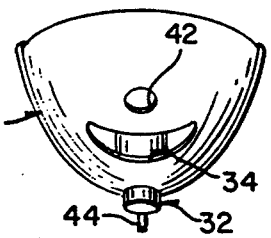
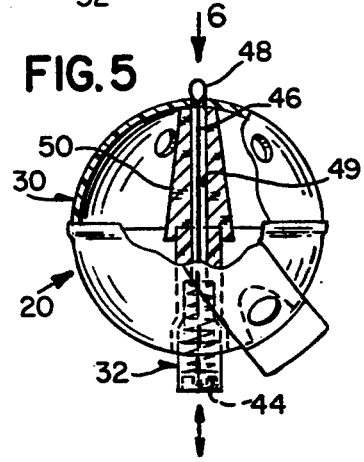
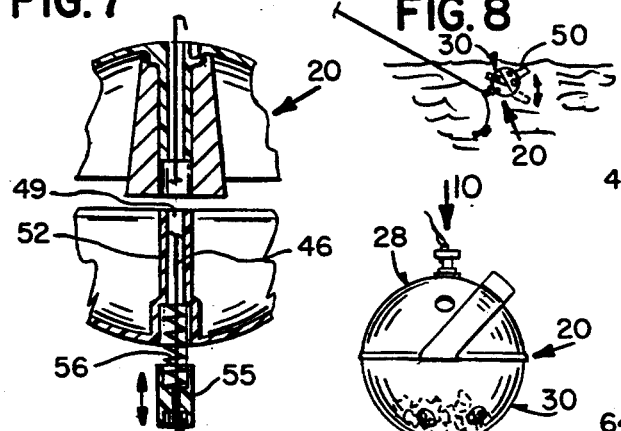
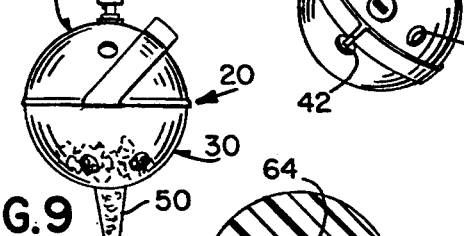
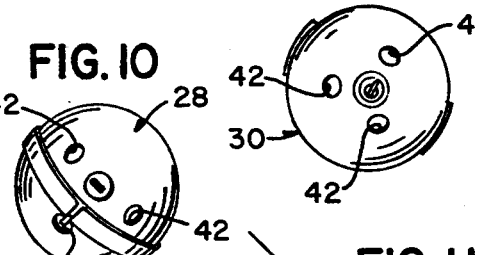
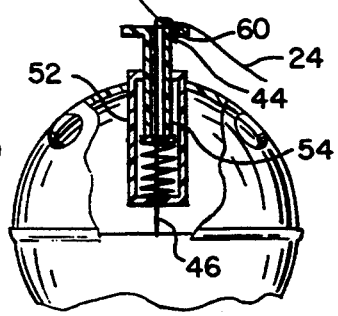
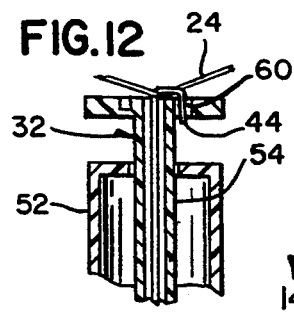
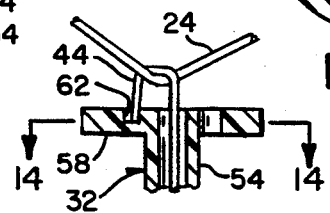

CHUM BOBBER FISHING LURE

BACKGROUND OF THE INVENTION

The invention relates to a floating fishing lure. More particularly, the invention relates to a floating device that slowly releases a fish attracting substance to lure fish to the vicinity of a fishing hook.

Typical fishing lures employ visual or auditory means for attracting fish.

Others contain fish attracting substances, but do not control their release, requiring frequent reloading.

Numerous other fishing lure equipment have been provided in prior art that are adapted to assist fisherman when catching fish. For example, U.S. Pat. Nos. 4,550,521 to Hayden; 4,961,280 to Hudson and 5,107,617 to Pendleton all are illustrative of such prior art.

While these units may be suitable for the particular purpose employed, or for general use, they would not be as suitable for the purposes of the present invention as described hereafter.

SUMMARY OF THE INVENTION

It is an object to produce a fishing lure that releases a fish attracting substance to lure fish to the vicinity of a fishing hook.

It is another object to produce a fishing lure that can be easily filled with a fish attracting substance such as fish food.

It is yet another object to produce a fishing lure that releases a fish attracting substance over an extended period of time.

It is still another object to produce a fishing lure that is economical to manufacture, and easy to use.

It is a further object to produce a fishing lure that attaches to a fishing line and floats.

It is a still further object to produce a fishing lure that can selectively slide freely along a fishing line, or maintain a fixed position along the fishing line.

The invention is a floating fishing lure, for attaching on a fishing line, comprising a hollow sphere having an upper hemisphere and a lower hemisphere, having a cavity therebetween. The lower hemisphere has a line clip for attaching to the fishing line. The lower hemisphere has a fill hole, in communication with the cavity, for filling the cavity with a fish attracting substance. The fill hole is selectively covered with a rubber band cover. The lower hemisphere has at least one vent hole, smaller in size than the fill hole, for slowly releasing the fish attracting substance.

To the accomplishment of the above and related objects, the invention may be embodied in the form illustrated in the accompanying drawings. Attention is called to the fact, however, that the drawings are: illustrative only. Variations are contemplated as being part of the invention, limited only by the scope of the claims.

BRIEF DESCRIPTION OF THE DRAWINGS

In the drawings, like elements are depicted by like reference numerals throughout the several views. The drawings are briefly described below.

FIG. 1 is a diagrammatic perspective view illustrating a first embodiment of the instant invention being used by a fisherman.

FIG. 2 is an enlarged diagrammatic perspective view, illustrated in the area indicated by arrow 2 in FIG 1.

FIG. 3 is a diagrammatic perspective view of a bottom hemisphere of the instant invention.

FIG. 4 is a view taken generally in the direction of arrow 4 in FIG. 3.

FIG. 5 is an enlarged elevational view partially in section, showing additional construction details thereof.

FIG. 6 is an enlarged view taken in the direction of arrow 6 in FIG. 5.

FIG. 7 is an enlarged exploded cross sectional view with parts broken away.

FIG. 8 is a perspective view illustrating a second embodiment of the instant invention in use.

FIG. 9 is an enlarged perspective view thereof.

FIG. 10 is a view taken in the direction of arrow 10 in FIG. 9.

FIG. 11 is an enlarged cross sectional view with parts broken away, illustrating the line attachment mechanism.

FIG. 12 is a still further enlarged cross sectional view with parts broken away, showing the line attachment in greater detail, with the line fixedly secured to the instant invention.

FIG. 13 is a still further enlarged cross sectional view with more broken away, showing the line attachment mechanism in greater detail, with the line having a slidable securement to the instant invention.

FIG. 14 is a cross sectional view taken along line 14—14 of FIG. 13.

DETAILED DESCRIPTION OF THE PREFERRED EMBODIMENTS

FIG. 1 illustrates a floating fish lure 20 in use by a fisherman 22. The floating fish lure 20 is attached on a fishing line 24. The lure 20 is floating on the surface of a body of water 26.

FIG. 2 is an enlarged view of the lure 20. The lure 20 is floating in the water 26. The lure 20 is hollow and has a lower hemisphere 28 and an upper hemisphere 30, forming a sphere with a cavity therein. The lure 20 has a line clip 32 attached to the lower hemisphere 28 at a point furthest from the upper hemisphere 30. The fishing line 24 is attached at the line clip 32, which is submerged in the water 26.

FIG. 3 illustrates the lure, with the upper hemisphere 30 shown in phantom. The lower hemisphere 28 has a fill hole 34 in communication with the cavity, for filling the lure 20 with a fish attracting substance 36. The fish attracting substance 36 can be a fish food such as chum.

The fill hole 34 is selectively covered with a rubber band cover 38, when the lure 20 is not being filled. The rubber band cover 38 is wide enough to cover the fill hole 34, and forms a tight seal over the fill hole 34. A rubber band cover tab 40 extends from the rubber band cover 38 and allows the rubber band to be easily gripped and moved to selectively cover and uncover the fill hole 34.

FIG. 4 illustrates the lower hemisphere 28. The fill hole 34 is shown in the shape of a banana. A vent hole 42 allows the fish attracting substance to slowly escape from the cavity to attract fish to the vicinity of the lure. The vent hole 42 is smaller than the fill hole 34. The line clip 32 has a line clip hook 44.

FIG. 5 is a cross sectional view of the lure 20. The lure 20 has central wire 46, having the line clip hook 44 on one end, and a top hook 48 at the other end. The central wire 46 extends through a lure axis 49 that extends from the line clip hook 44, through the center of the lure to an opposite end of the lure, where the top hook 48 is located. The top hook 48 extends from the lure 20 opposite the line clip 32. The top hook 48 is rigidly attached to the central wire 46, and rotates with the central wire 46.

A cork 50 is present at the upper hemisphere 30 to maintain the buoyancy of the lure 20, even when it fills with water. The cork is mounted along the central axis 49.

FIG. 6 illustrates three vent holes 42 present on the upper hemisphere 30.

FIG. 7 further illustrates the mechanism of the line clip 32. An outer casing 52 extends through the lure along the central axis 49. An inner casing 55 is mounted for slidable movement within the outer casing 52. A spring 56 is mounted between the inner casing 55 and outer casing 52 to regulate their relative movement. The central wire 46 extends through the outer casing 52 and inner casing 55. When the inner casing 55 is pushed into the outer casing 52, toward the center of the lure 20, the spring 56 is compressed so that when the inner casing 55 is released it will restore to its position prior to being pushed into the outer casing 52.

FIG. 8 illustrates a second embodiment of the lure 20 in which the cork 50 extends externally from the upper hemisphere 30. Positioning the cork in this manner alters the buoyancy characteristics of the lure 20. With the cork so mounted, a larger portion of the rest of the lure 20 will be submerged.

FIG. 9 details the second embodiment of the lure 20. The cork 50 extending from the upper hemisphere 30, and having a truncated tapered shape.

FIG. 10 illustrates the lower hemisphere 28 having three vent holes 42.

FIG. 11 further illustrates the mechanism of the line clip 32. The inner casing 54 has a clip plate 58 at an end of the inner casing external to the lure 20. The clip plate has a first hole 60, extending through the clip plate 58. The spring 56 mounted between the inner casing 54 and outer casing 52 biases the inner casing against the line clip hook 44 that is attached at the end of the central wire 46. The line clip hook 44 extends into the first hole 60 in the clip plate 58. In this position the line clip hook lastly holds the fishing line 24.

FIG. 12 illustrates the line clip hook 44 in a first position, where it holds the fishing line 24 so that the lure will maintain its position on the fishing line 24. To put the line clip hook 44 in the first position, the inner casing 54 has been compressed into the outer casing 52 and rotated so that the line clip hook 44 extends into the first hole 60. The inner casing 54 has been released, the line clip hook 44 extending into the first hole 60, holding the fishing line 24 fast.

FIG. 13 illustrates the line clip hook 44 in a second position, where it allows the fishing line 24 to slidably move through the line clip 32. To put the line clip hook 44 into the second position, the inner casing 54 has been compressed and rotated so that the Line clip hook is aligned to extend into the second hole 62. The second hole 62 does not extend fully through the clip plate 58. The inner casing 54 has been released, the line clip hook 44 extending into the second hole 62, leaving sufficient clearance in the line clip hook 44 to allow the fishing line to move freely through the line clip hook 44.

FIG. 14 illustrates the line clip plate 58. The line clip plate 58 has a central hole 64 through which the central wire 46 extends. The first hole 60 and the second hole 62 are located the same distance from the central hole 64 corresponding to the distance between the line clip hook 44 and central wire 46.

It is important to note that if the clip plate 58 is thick enough, the first hole need not extend fully through the clip plate 58. All that is necessary in a properly calibrated lure, is that the first hole 60 is deeper than the second hole 62. In that case, the first hole would only need to be deep enough so that the line clip hook 44 can pull tightly on the fishing line 24, preventing the fishing line 24 from sliding therein.

What is claimed is:

1. A floating fishing lure, for attaching on a fishing line, comprising:
    a) an upper hemisphere and a lower hemisphere, the upper and lower hemisphere attached to each other to form a hollow sphere with a cavity formed therein, the lower hemisphere having a fill hole in communication with the cavity and at least one vent hole in communication with the cavity, the vent hole being smaller than the fill hole;
    b) a line clip, attached to the lower hemisphere for attaching the lure to the fishing line; and
    c) a rubber band cover, attached between the upper hemisphere and lower hemisphere, for selectively covering the fill hole.

2. The apparatus as recited in claim 1, wherein the lower hemisphere has at least three vent holes, and the rubber band cover further comprises a rubber band cover tab.

3. The apparatus as recited in claim 1, further comprising a cork, mounted between the upper hemisphere and lower hemisphere, for maintaining the buoyancy of the lure when the cavity fills with water.

4. The apparatus as recited in claim 1, wherein the line clip has a line clip hook which is selectively movable between a first position, where it allows the fishing line to slidably move through the line clip, and a second position, where it rigidly holds the fishing line.

5. The apparatus as recited in claim 1, further comprising a cork, the cork mounted to the upper hemisphere, and extends externally from the upper hemisphere.

6. The apparatus as recited in claim 2, wherein the line clip has a line clip hook which is selectively movable between a first position, where it allows the fishing line to slidably move through the line clip, and a second position, where it rigidly holds the fishing line.

7. The apparatus as recited in claim 3, wherein the line clip has a line clip hook which is selectively movable between a first position, where it allows the fishing line to slidably move through the line clip, and a second position, where it rigidly holds the fishing line.

8. The apparatus as recited in claim 5, wherein the line clip has a line clip hook which is selectively movable between a first position, where it allows the fishing line to slidably move through the line clip, and a second position, where it rigidly holds the fishing line.

9. The apparatus as recited in claim 4, further comprising a clip plate having a first hole and a second hole, the first hole deeper than the second hole, the line clip hook extending into the first hole in the first position of the line clip hook and extending into the second hole in the second position of the line clip hook.

10. The apparatus as recited in claim 9, where the line clip further comprises an inner casing and an outer casing, inner casing mounted for slidable movement within the outer casing, a spring mounted between the inner casing and outer casing biasing the inner casing against the line clip hook.

11. The apparatus as recited in claim 10, further comprising a central wire, extending through the inner casing, the central wire having the line clip hook attached at one end and having a top hook attached at another end.

* * * * *